United States Patent [19]

Falkehag et al.

[11] 3,841,887
[45] Oct. 15, 1974

[54] DYESTUFF COMPOSITIONS CONTAINING LIGNIN SURFACTANTS CARBOXY SUBSTITUTED

[75] Inventors: Sten I. Falkehag, Mount Pleasant; Carl W. Bailey, III, Charleston, both of S.C.

[73] Assignee: Westvaco Corporation, New York, N.Y.

[22] Filed: July 27, 1972

[21] Appl. No.: 275,535

[52] U.S. Cl............................ 106/123 LC, 260/124
[51] Int. Cl............................................. C08h 15/02
[58] Field of Search..... 106/123; 260/124; 252/356; 8/91, 86

[56] References Cited
UNITED STATES PATENTS
3,578,651   5/1971   Ludwig.............................. 260/124
3,763,139   10/1973  Falkehag............................. 8/86 X OTHER PUBLICATIONS
Lignin–Derived Dispersants, Gerald Prazak, Nov. 1970 – American Dyestuff Rep., pp. 44–46.

*Primary Examiner*—Theodore Morris
*Attorney, Agent, or Firm*—Richard L. Schmalz; Ernest B. Lipscomb, III

[57] ABSTRACT

Dyestuff compositions comprising an admixture of a dye cake, i.e., disperse dyes and vat dyes, and up to 75 percent by weight of an improved lignin surfactant. The improved lignin surfactant is the lignin-carboxymethylene derivative made by reacting with an alkali lignin or sulfonated lignin up to 20 moles, preferably from 1 to 10 moles (per 1,000 grams of lignin), of a halogen-containing methane carboxylic acid. The preferred reactant is chloroacetic acid or the sodium salt of chloroacetic acid. These improved sulfonated lignin adducts are lighter in color, and lessen or eliminate fiber staining, diazo dye reduction and foaming problems.

6 Claims, No Drawings

DYESTUFF COMPOSITIONS CONTAINING LIGNIN SURFACTANTS CARBOXY SUBSTITUTED

BACKGROUND OF THE INVENTION

1. Field of the Invention

This invention relates to improved lignin surfactants and their use as dispersants in dyestuffs. More particularly, this invention relates to lignin-carboxymethylene derivatives which may be made by reacting a lignin with a halogen-containing methane carboxylic acid.

2. The Prior Art

Dyestuff compositions comprise, for the most part, a dye cake, i.e., disperse dyes and vat dyes, and a dispersant. These dyestuff compositions are widely used to color both natural and synthetic fibers. The dye dispersants that may be used to disperse the dye cake vary widely in method of manufacture and source. In the dyestuff composition the dispersant serves three basic functions. It assists in reducing the dye particle to a fine size, it maintains a dispersing medium and it is used as an inexpensive diluent. Generally, however, dye dispersants have been of two major types, sulfonated lignins from the wood pulping industry via the sulfite or kraft processes and naphthalene sulfonates from the petroleum industry. Specialty products such as licorice extracts and various synthetic organic compounds are also used in minor segments of the dispersing market. Each of these surfactants has found application in one or more areas of dye dispersion; however, each dispersing agent possesses one or more undesirable properties.

The disadvantages of lignins, whether they are sulfite lignins or sulfonated kraft lignins, include fiber staining, reduction of diazo-type dyes, dark brown color and a tendency to stabilize foams. These adverse properties are bothersome to the dyers.

Fiber staining by the lignin occurs mainly on cellulosic and nitrogenous fibers such as cotton, nylon and wool; polyester fibers are also stained but to a lesser extent. The brown stain tends to impart a dull appearance to the dyed fiber which is undesirable. Moreover, the brown lignin stain tends to fade upon exposure to sunlight.

The disperse dyes are typically of the anthraquinone, diazo or diphenylamine classes of dyes. A second disadvantage of sulfonated lignin dispersants has been that when dyeing with diazo-type dyes under high temperature and pressure dyeing processes, the oxidizable lignin structures tend to reduce the diazo dye linkage.

Another disadvantage, the brown color, is psychological. A dyer that purchases a canary yellow dyestuff objects to the brown shading of the bright yellow dye, even though the actual dyeing is precisely the shade it should be.

Lastly, foam stabilization properties are troublesome for several reasons. First, in ball milling or grinding in general, foam creates cleaning problems by frothing out of dispersion tanks and by building up foam within ball mills which generally slows the grinding process. Spray drying a liquor with considerable foam causes a fluctuation of the temperature within the dryer. As many dyes are acutely sensitive to heat, this can cause deterioration of these particular dyestuffs. In dye application, foaming in a dye bath results in actual loss of color which floats out of the dye bath with the foam. In printing or thermosol application, air bubbles produce light, undyed spots on piece goods. Particularly troublesome in this regard is the introduction of new dye processing equipment such as the jet dyer where much turbulenece occurs.

The advantages that lignin dispersants possess over other dispersants include the ability to impart better heat stability to the dye dispersion, and to disperse with equal effectiveness. Another advantage of lignin dispersant is that it tends to act as a dye retarder. Some dyes have a tendency to start dyeing at very low temperatures. Dyers prefer colors to dye a fiber at a steady rate proportional to temperature increase. If the color dyes too rapidly, the goods take on a streaky appearance; and creases in the material dye more rapidly than the face of the cloth. For this reason, napthalene sulfonates rarely are used alone since they seem to have no retardant properties.

With the advantages and disadvantages of lignin dispersants in mind, it is therefore the general object of this invention to provide a dyestuff composition containing alkali and sulfonated lignin-carboxymethylene derivatives as dispersing agents that are capable of reducing dye particles to a fine size, satisfactorily dispersing the dye and overcoming, to a large degree, the undesirable properties of commercially available dispersants. Another object of this invention is to provide a dyestuff composition whose dispersion is stable under heat and pressure. A further object of this invention is to provide a dyestuff composition containing an alkali lignin dispersant or a sulfonated lignin dispersant which is relatively non-staining. Still a further object of this invention is to provide a dispersant which does not stabilize foam. An even further object of this invention is to provide a lignin-carboxymethane derivative dye dispersant which will not reduce diazo dyes under high temperatures and pressures.

Further objects, features and advantages of this invention will be evident from the following disclosure.

SUMMARY OF THE INVENTION

It has been found that the above objects may be accomplished when lignin-carboxymethylene derivatives are used as improved dispersants in dyestuff compositions. The inclusion of 1 to 75 percent by weight of these derivatives with water insoluble dyes such as, disperse dyes and vat dyes, produces a dyestuff composition which retains the advantages and properties of commercially available sulfonated lignin dispersants while eliminating or substantially reducing the undesirable characteristics such as fiber staining, diazo dye reduction, foaming and color. The lignin-carboxymethylene derivatives may be made by reacting up to 20 moles per 1,000 grams of lignin, preferably from 1 to 10 moles of a halogen-containing methane carboxylic acid. The preferred reactant is chloroacetic acid or the sodium salt of chloroacetic acid.

DETAILED DESCRIPTION OF THE INVENTION

The lignins employed to make the adducts of this invention include both alkali lignins and sulfonated lignins from sources such as sulfite lignins from acid and neutral processes, kraft lignins from the sulfate pulping process and lignins derived from other alkaline processes such as the soda or modified soda processes. The sulfonated lignin starting material used to form the derivative is in the ionized form at neutral or alkaline conditions. In carrying out the dyeing process with the alkali or non-sulfonated lignin derivative dispersants of this invention it is important that the pH of the dye solution be at least pH 6 or above so that the non-sulfonated lignin derivative will ionize. One of the main sources of sulfonated lignin is the residual pulping liquors of the paper and pulp industries where lignocellulosic materials such as wood, straw, corn stalks, bagasse, and the like are processed to separate the cellulose or pulp from the lignin. For example, the black liquor obtained from the kraft, soda and other alkali processes is not recovered as a sulfonated product but may easily be sulfonated by reacting the product with a bisulfite or sulfite. In the sulfite pulping process, the lignocellulosic material is digested with a bisulfite or sulfite to obtain a sulfonated residual pulping liquor wherein the sulfonated lignin is dissolved. Likewise, lignin known as "hydrolysis lignin" obtained from the hydrolysis of lignocellulosic materials in manufacturing wood sugars, or "hydrotropic lignins" derived from hydrotropic pulping processes may be sulfonated and used.

The residual liquors or products containing the lignin portion of the lignocellulosic materials from the various processes may be treated by the conventional methods to sulfonate the lignin to the different degrees desired. The lignin may be sulfonated either prior to or subsequent to the forming of the adduct. The sulfonated lignins are used as salts of ammonia or alkali metals, such as magnesium, calcium, sodium and potassium with the sodium salt of a sulfonated kraft lignin being preferred. The sulfonated lignins thus obtained may be used as such in the reaction to form the adduct, or may be converted to the free acid form by addition of an acid or by use of ion exchange resins and then converted to salts or complexes of metals or other cations other than that obtained in the sulfonation process. By the term "sulfonated lignin," it is meant any lignin containing at least an effective amount of sulfonate groups to be water-soluble. Any of the sulfonated lignins may contain up to one-half of other materials such as carbohydrates, phenols and other organic and inorganic compounds. The presence of these other materials results in larger consumption of the reactants used to form the adduct; therefore some purification of the sulfonated lignin starting material is often desirable. The nonsulfonated lignin materials may be removed by various known methods.

The degree of sulfonation present in the lignin is not a controlling factor in making the adduct but may be used to tailor the adduct to have desired characteristics. For example, a highly sulfonated lignin may be referred to as one having above 1 mole sulfonation per 1,000 grams of lignin. On the other hand, a sulfonated lignin dispersant having less than 1 mole of sulfonation per 1,000 grams of lignin is referred to as a low degree sulfonated lignin.

As the lignin-carboxymethylene derivative is formed, the reactant serves to block the hydroxyl groups of lignin. A derivative having improved properties is obtained by reacting as little as one mole of reactant per 1,000 grams of alkali lignin or sulfonated lignin starting material. The derivatives made may have up to 20 moles of reactant per 1,000 grams of lignin starting material, but preferably between 1 and 10 moles. Above this upper limit, little, if any, improvement is noted in such properties as fiber staining and diazo dye reduction. For most dyeing applications an adduct having from 2 to 6 moles of reactant per 1,000 grams of lignin starting material is used. The formation of the derivative serves primarily to lower the acid hydroxyl content of the lignin. Depending upon the starting lignin material, whether residual pulping liquors or a refined product, the acid hydroxyl content of the lignin begins to be blocked by amounts of reactant below 1 mole per 1,000 grams of lignin and with about 10 moles of reactant per 1,000 grams of lignin can be reduced to substantially zero.

The derivative is formed by reacting an alkaline aqueous solution of lignin with a halogen-containing methane carboxylic acid. An example of a preferred halogen-containing methane carboxylic acid is chloroacetic acid or the sodium salt of chloromethane carboxylate. The reaction may be described as follows:

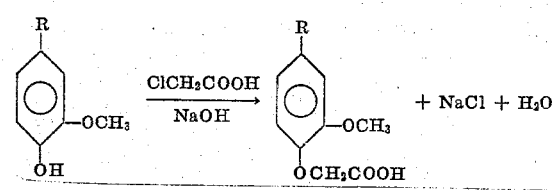

A general procedure for making the adduct according to this method is to dissolve the lignin in an alkaline solution and add a given amount (molar ratio based on weight of lignin) of chloroacetic acid. The solution is heated to at least 40°C. but not above 200°C., preferably to between 90°–100°C. The pH of the solution is adjusted to a pH of 7 or above, preferably between 9.0 and 12.5, depending upon specific reactants. The pH is held near the starting pH or slightly above until the reaction is complete. At the end of the reaction the solution is cooled and then dried.

The dispersants of this invention are particularly useful with disperse dyes or vat dyes in either the dry or liquid form. The lignin-carboxymethylene derivative may be added to the dye cake before, during or after grinding. It is generally preferred to add the derivative prior to grinding so that it will be thoroughly mixed and aid in particle size reduction. The amount of lignin-carboxymethylene derivative added to a dye will vary widely, depending upon the particular dye cake, the material to be dyed and the effect desired. Amounts up to 75 percent of the lignin dispersant, based upon the weight of dried dye cake may be used. The most important factor in determining the proper amount of lignin derivative to be used in making up the dyestuff is the particular dye cake used. Generally this amount will vary from dye to dye.

The lignin dispersants of this invention have for the most part eliminated the need for other additives in the dyestuff composition, but for special dyeing problems wetting agents, defoamers, carriers or other additives may be included.

The procedure for determining each physical property is set forth below.

The test for determining extent of fiber staining caused by lignin based surfactants was to weigh out 10 grams of the lignin-based surfactant and dissolve in 300 ml of tap water. Adjust the pH to 9.0 with acetic acid. Add a 5 gram nylon fiber skein and heat to a boil. Boil the mixture for 15 minutes, wash the skein with tap water and dry in an oven at 105°C.

The test for determining foaming properties of disperse dye surfactants was to weight out 1 gram of surfactant and dissolve in 100 ml. of tap water. Adjust to pH 9.5 with acetic acid and pour into a 250 ml. graduated cylinder. Rapidly invert five times and measure the height of the foam in ml. immeidately after completing the inversions and again after 1 minute and 2 minutes have elasped. If the foam disappears within 2 minutes note the time at which all the foam vanished. Return the solution after all the foam has broken (or 2 min.) and lower the pH to 7.0 with acetic acid and again perform the inversion and recording part of the test.

The diazo dye reduction test was performed by charging a pressure bomb with 500 mg. of C. I. 21000 (Disperse Brown 1) dye, 200 cc. water, and 20 grams of sulfonated lignin dispersant. The mixture was thoroughly stirred and the pH adjusted to between 5 and 6 with acetic acid. A 10 gram nylon skein was placed in the dye mixture, the bomb sealed and heated to 130°C. for 1 hour. After cooling, the skein was removed from the bomb, washed and dried. The reduction in color was compared by visual observation, but may, if desired be determined by analysis of the residual solution with a spectrometer.

The test for determining the dispersing ability of a dye dispersant was to weight out 35 grams of the dispersant and mix with 50 grams of C. I. 11110 (Disperse Red 1) dye and 130 grams of water. The mixture was thoroughly stirred and ball milled to a fine particle size. Then filter the dispersion through No. 4 Whatman filter paper under vacuum. Then the residual material is determined.

The practice of this invention may clearly be seen in the following examples.

Example 1

To illustrate the advantage gained by incorporating a sulfonated lignin-carboxymethylene derivative dispersant into a dyestuff, a series of runs were made in which the properties of various dispersions were compared. In this example, alkali sulfonated lignin was reacted with chloromethane carboxylate to make the lignin adduct. The conditions used in the example were, 300 grams of sulfonated lignin; thoroughly dissolved in 600 ml. of distilled water. A given amount, 1.5–10 moles/1,000 grams lignin material, depending on the run, of chloromethane carboxylic acid was measured out and put into a dropping funnel. The reaction solution was adjusted to pH 10.5 with 50 percent sodium hydroxide solution and the temperature raised to about 95°C. under a nitrogen atmosphere and constant stirring. When the desired temperature had been reached the chloromethane carboxylic acid was added dropwise, over approximately ½ hour – 1 ½ hours, to the reaction solution while the pH was maintained between 10.5 and 11.5 by the addition of 50% NaOH solution. At the end of the reaction, the solution was allowed to cool and was then spray dried in an Anhydro Spray Dryer.

The sulfonated lignin-carboxymethylene derivatives having varying moles of reactant (from 1.5 moles to 10 moles) were tested for their dispersing ability, fiber staining, foaming and diazo dye reduction properties compared to a commercially available sulfonated lignin dispersant (Run No. 1, Control), Polyfon "0." The results are shown in the table below.

| | Sulfonated Lignin-Chloroacetic Acid Derivative | | | | | |
|---|---|---|---|---|---|---|
| Run | Moles Reactant/ 1000 grams lignin | Diazo Dye[1] Reduction | Fiber[2] Staining | Foaming Test[3], ml of foam, pH 7 Initial | 1 min. | 2 min. |
| 1 | control | 5 | 5 | 50 | 8 | 4 |
| 2 | 1.5 | 4 | 2–3 | 35 | 6 | (15) |
| 3 | 3 | 2 | 2 | 45 | (55) | — |
| 4 | 6 | 1 | 1–2 | 35 | (28) | — |
| 5 | 10 | 1 | 1 | 30 | (26) | — |

Notes:
[1] 1 = little or no diazo dye reduction, 5 = severe diazo dye reduction.
[2] 1 = little or no fiber staining, 5 = severe fiber staining.
[3] Numbers in parenthesis represent seconds required for foam to break.

The results show that the sulfonated lignin-carboxymethane derivatives of this invention substantially improve diazo dye reduction, fiber staining and foaming. They were all good dispersants. These sulfonated lignin derivatives were also equal or better dispersants at all temperatures than the commercially available sulfonated lignin dispersants.

Example 2

This example illustrates the properties obtained from lignin derivative dispersants of this invention made from REAX 80A. The procedure of Example 1 was followed except that REAX 80A, a commercially available sulfonated kraft lignin by Westvaco Corporation was reacted with chloroacetic acid to form the lignin derivative dispersant. The lignin derivatives were tested for diazo dye reduction, fiber staining, foaming and dispersing ability. The various properties were compared to REAX 80A, a commercially available sulfonated kraft lignin dispersant, shown in Run No. 1. The results are shown in the table below.

| | Sulfonated | Lignin - ClCH$_2$COOH Derivatives as Dyestuff Dispersants | | | | | | |
|---|---|---|---|---|---|---|---|---|
| | Moles Reactant 1000 gms. Lignin | Diazo Dye[1] Reduction | Fiber[2] Staining | Foam Test[3], ml. of Foam | | | | |
| | | | | pH 7.0 | | | pH 9.5 | |
| Run | | | | Init. | 1 min. | 2 min. | Init. | 1 min. |
| 1 | Reax 80A | 4 | 4–5 | 50 | 10 | 6 | 35 | 15 |
| 2 | 1.5 | 3–4 | 3–4 | 30 | 4 | 4 | — | — |
| 3 | 6 | — | — | 45 | (58) | — | 45 | 10 |
| 4 | 10 | 1–2 | 1 | 30 | (56) | — | 30 | 8 |

Notes:
[1] 1 = little or no diazo dye reduction, 5 = severe diazo dye reduction.
[2] 1 = little or no fiber staining, 5 = severe fiber staining.
[3] Numbers in parenthesis represent seconds required for the foam to break.

In all cases the fiber staining and diazo dye reducing tendencies improved when compared with the conventional sulfonated lignin dispersant of Run No. 1. Furthermore, good dispersant properties were retained and foaming decreased significantly.

Example 3

In this example an alkali lignin was dissolved in a sodium hydroxide solution and 6 moles of the sodium salt of chloroacetic acid was mixed. The solution was heated at about 95°C. and the pH maintained between 10.5 and 11.5 by the addition of 50 percent NaOH until the reaction was complete. After drying the lignin-carboxymethylene derivative was tested as a disperse dye dispersant. The lignin-carboxymethylene derivative had excellent dispersing ability, excellent stability against tarring at boil, fiber staining was 2–3 and foaming was good.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A dyestuff composition comprising a disperse dye cake and from 1 percent to 75 percent by weight of said dye cake, of the derivative of a lignin-based material, said derivative containing from 1 to 20 moles per 1,000 grams of a carboxymethylated lignin and made by reacting lignin with a halogen-containing methane carboxylate wherein the methane is halogen substituted.

2. The dyestuff composition according to claim 1 wherein said lignin is an alkali lignin.

3. The dyestuff composition according to claim 1 wherein said lignin is a sulfonated lignin.

4. The composition according to claim 3 wherein said sulfonated lignin is based on a sulfite waste liquor lignin-containing product.

5. The composition according to claim 1 wherein said halogen-containing methane carboxylic acid is chloroacetic acid.

6. The composition according to claim 1 wherein said derivative comprises a lignin reacted with from 1 to 10 moles of said halogen-containing methane carboxylate per 1,000 grams of lignin starting material.

* * * * *